UNITED STATES PATENT OFFICE.

HORATIO A. FEE AND GARCIEA H. AEVEAENES, OF SAN ANTONIO, TEXAS.

PROCESS FOR TREATING COTTON-SEED.

1,304,670.         Specification of Letters Patent.     Patented May 27, 1919.

No Drawing.     Application filed June 4, 1917. Serial No. 172,840.

*To all whom it may concern:*

Be it known that we, HORATIO A. FEE and GARCIEA H. AEVEAENES, citizens of the United States, residing at San Antonio, in the county of Bexar and State of Texas, have invented certain new and useful Improvements in Processes for Treating Cotton-Seed, of which the following is a specification.

This invention has relation to a process for treating cotton seed, peanut kernels, and other grains and seeds.

An object of the invention is to provide a process for treating cotton seed whereby oil may be expressed therefrom, subsequent to treatment, and whereby refined oil may be expressed in the usual manner, thereby obviating the necessity for a further treatment of the oil to further purify the same.

The oil expressed from untreated cotton seed is known as crude cotton seed oil and it contains in solution a characteristic coloring matter, which gives it a ruby red color. This color is due to the presence of an acid which is removed in the refining process by means of alkali which serves to neutralize the acid and precipitate solid matter. The solid matter is subsequently removed by adding fullers' earth and filtering the oil.

It is therefore our object to subject cotton seeds prior to pressing to a process whereby the acid, and other poisonous impurities are removed so that the treated cotton seed may be pressed in the usual manner and a pure and refined cotton seed oil obtained immediately.

Our process is carried out largely in what is known as a centrifugal machine, or hydro-extractor. This machine is used in the manufacture of sugar and while made in various forms, a typical machine consists of a drum revolving on a vertical shaft, the sides of the drum being formed of wire gauze for holding the material. The drum is surrounded by a casing to provide an annular space for the reception of material which is expelled by centrifugal force through the sides of the drum when the latter revolves at a high speed. The cotton seeds are first hulled and the kernels placed in the drum of the centrifugal machine which is then rotated at a high rate of speed for about five minutes or until the dust has been cleaned from the kernels. The next step consists in spraying the kernels while in the machine with a weak solution (about 5%) of common salt. The solution may be sprayed upon the kernels by means of an atomizer or any device capable of producing a fine spray. The machine is again set in motion and the motion continued while the kernels are sprayed, the addition of the solution being continued until the kernels have been thoroughly cleaned. The motion of the machine is then continued at the highest speed without further addition of the solution, until the kernels are thoroughly dried. The machine is then stopped and a sample of the kernels removed, the oil expressed and tested to determine whether or not the impurities have been completely removed. If the test shows impurities to still remain present, the process of spraying is continued until further analysis shows the kernels to be entirely free from acid.

It has been our experience that kernels of the cotton seed, after having been cleaned by the process described above, form a pure and wholesome food, which may be utilized to make bread, or which may be fed without cooking to animals. Furthermore, a pure and refined oil may be expressed directly from the treated kernels without requiring further purifying of the oil or filtration. The oil thus extracted is furthermore odorless and ranges in color from very pale yellow to golden yellow.

Having thus described our invention, what we claim as new and desire to secure by Letters Patent is:—

1. The herein described method of treating cotton seed, which consist of hulling the seed, then submitting the hulled seed to centrifugal action, then spraying the seed with a saline solution, then submitting the seed to centrifugal action and simultaneously spraying them with a solution of common salt and water, then stopping the spray and accelerating the centrifugal motion which is continued until all the moisture is driven off.

2. The herein described method of treating cotton seed, which consist of hulling the seed, then submitting the hulled seed to centrifugal action, then spraying the seed with a saline solution, then submitting the seed to centrifugal action and simultaneously spraying them with a solution of common salt and water, then stopping the spray and accelerating the centrifugal motion which is continued until all the moisture is driven off, and finally subjecting the seed to pressure sufficient to express the oil therefrom.

In testimony whereof we affix our signatures in presence of two witnesses.

HORATIO A. FEE.
GARCIEA H. AEVEAENES.

Witnesses:
B. F. CRUMP,
A. E. EVANS.